United States Patent
Yang

(10) Patent No.: US 9,269,330 B2
(45) Date of Patent: Feb. 23, 2016

(54) HEAD MOUNTED DISPLAY APPARATUS AND BACKLIGHT ADJUSTMENT METHOD THEREOF

(71) Applicant: Quanta Computer Inc., Tao Yuan Shien (TW)

(72) Inventor: Wen-Chu Yang, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 57 days.

(21) Appl. No.: 14/195,155

(22) Filed: Mar. 3, 2014

(65) Prior Publication Data

US 2015/0187330 A1 Jul. 2, 2015

(30) Foreign Application Priority Data

Jan. 2, 2014 (TW) .............................. 103100012 A

(51) Int. Cl.
*G09G 5/10* (2006.01)
*G02B 27/01* (2006.01)
*G09G 3/36* (2006.01)
*G09G 3/00* (2006.01)
*G09G 3/34* (2006.01)

(52) U.S. Cl.
CPC ................ *G09G 5/10* (2013.01); *G02B 27/017* (2013.01); *G09G 3/001* (2013.01); *G09G 3/3406* (2013.01); *G09G 3/3648* (2013.01); *G02B 2027/014* (2013.01); *G02B 2027/0118* (2013.01); *G02B 2027/0138* (2013.01); *G02B 2027/0178* (2013.01); *G09G 2320/0285* (2013.01); *G09G 2330/12* (2013.01); *G09G 2360/144* (2013.01)

(58) Field of Classification Search
CPC ....... G09G 5/10; G09G 3/3648; G09G 3/001; G09G 3/3406; G09G 2320/0285; G09G 2330/12; G09G 2360/144; G02B 27/017; G02B 27/0172; G02B 2027/0178; G02B 2027/0118; G02B 2027/0138; G02B 2027/014
USPC ...................................... 345/102, 690–699, 8
See application file for complete search history.

(56) References Cited

U.S. PATENT DOCUMENTS

| | | | |
|---|---|---|---|
| 6,926,429 B2 * | 8/2005 | Barlow et al. ................. | 362/464 |
| 7,744,216 B1 * | 6/2010 | Uhlhorn ........................ | 351/204 |
| 8,319,804 B2 * | 11/2012 | Kuo ...................... | G06F 1/1637 |
| | | | 345/174 |

(Continued)

FOREIGN PATENT DOCUMENTS

CN 103293673 A 9/2013
JP 2011-085829 A 4/2011

OTHER PUBLICATIONS

Taiwanese Office Action dated May 8, 2015.

*Primary Examiner* — Dmitriy Bolotin
(74) *Attorney, Agent, or Firm* — Rabin & Berdo, P.C.

(57) ABSTRACT

A head mounted display apparatus and a backlight adjustment method thereof are disclosed. The head mounted display apparatus comprises a display module, a backlight module, an application processor, an eye image capture apparatus, an infrared (IR) light emitting diode (LED) and an application specific integrated circuit (ASIC). The backlight module provides a backlight to the display module. The eye image capture apparatus captures an eye image. The IR LED provides an auxiliary light source to the eye image capture apparatus. The ASIC calculates a current pupil size according to the eye image. The application processor adjusts the backlight intensity of the backlight module according to the current pupil size in an adjustment mode.

15 Claims, 7 Drawing Sheets

(56) References Cited

U.S. PATENT DOCUMENTS

| | | | | |
|---|---|---|---|---|
| 2009/0225278 A1* | 9/2009 | Chen | ........................ | G06F 3/013 351/210 |
| 2010/0321482 A1* | 12/2010 | Cleveland | ........................ | 348/78 |
| 2011/0080421 A1* | 4/2011 | Capener | ........................ | 345/589 |
| 2013/0114043 A1* | 5/2013 | Balan et al. | ................... | 351/210 |
| 2013/0147859 A1* | 6/2013 | Kobayashi | ............... | G09G 5/10 345/690 |
| 2014/0104436 A1* | 4/2014 | Bork | ........................ | H04N 5/58 348/184 |
| 2015/0002373 A1* | 1/2015 | Kobayashi | ........... | G02B 27/017 345/8 |
| 2015/0015460 A1* | 1/2015 | Kobayashi | ........... | G02B 27/017 345/8 |

* cited by examiner

HEAD MOUNTED DISPLAY APPARATUS AND BACKLIGHT ADJUSTMENT METHOD THEREOF

This application claims the benefit of Taiwan application Serial No. 103100012, filed Jan. 2, 2014, the subject matter of which is incorporated herein by reference.

BACKGROUND OF THE INVENTION

1. Field of the Invention

The invention relates in general to an electronic apparatus, and more particularly to a head mounted display apparatus and a backlight adjustment method thereof.

2. Description of the Related Art

Along with the advance in technology, people assimilate more and more information every day. The commonly seen multimedia play apparatus, network communication apparatus and computer apparatus are equipped with a CRT or LCD display for displaying images. However, the pixels and size of a displayed image depend on the size and efficiency of the display. Conventional CRT or LCD display cannot meet the requirements of large size and convenient portability at the same time. To resolve the above problem, an optical see-through head mounted display (HMD) apparatus is provided. The optical see-through HMD apparatus allows the user to see the real image of the physical world and the virtual image provided by the head mounted display apparatus at the same time. The head mounted display apparatus has a CRT or LCD display disposed in front of each eye. The head mounted display apparatus projects the image outputted by respective CRT or LCD display onto the user's retina through a beam splitter and creates a 3D effect by using the parallax between the user's two eyes. However, when the luminance level of a virtual image is higher than the ambient light luminance, the user will feel the virtual image projected on the display module dazzling. Conversely, if the ambient light luminance is higher than the luminance of a virtual image, the user will be unable to clearly see the virtual image projected on the display module. Therefore, how to avoid the ambient light luminance affecting the user's visual perception has become a prominent task for the industries.

SUMMARY OF THE INVENTION

The invention is directed to a head mounted display apparatus and a backlight adjustment method thereof capable of dynamically adjusting the backlight intensity according to the ambient light luminance.

According to one embodiment of the present invention, a head mounted display apparatus is disclosed. The head mounted display apparatus comprises a display module, a backlight module, an application processor, an eye image capture apparatus, an infrared (IR) light emitting diode (LED) and an application specific integrated circuit (ASIC). The backlight module provides a backlight to the display module. The eye image capture apparatus captures an eye image. The IR LED provides an auxiliary light source to the eye image capture apparatus. The ASIC calculates a current pupil size according to the eye image. The application processor adjusts the backlight intensity of the backlight module according to the current pupil size in an adjustment mode.

According to another embodiment of the present invention, a backlight adjustment method of head mounted display apparatus is provided. The method comprises following steps. An eye image is captured by an eye image capture apparatus. An auxiliary light source is provided to the eye image capture apparatus by an infrared (IR) light emitting diode (LED). A current pupil size is calculated according to the eye image. The backlight intensity of the backlight module is adjusted according to the current pupil size in an adjustment mode.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
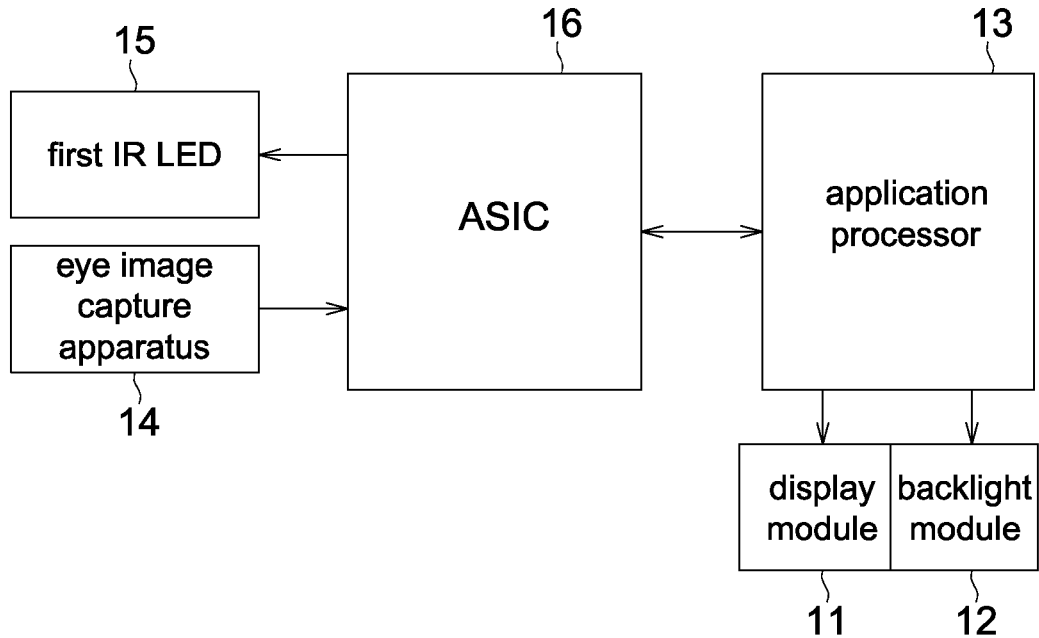
FIG. 1 is a block diagram of a head mounted display apparatus according to a first embodiment.

Referring to FIG. 1, a block diagram of a head mounted display apparatus according to a first embodiment is shown. The head mounted display apparatus 1 comprises a display module 11, a backlight module 12, an application processor 13, an eye image capture apparatus 14, a first infrared (IR) light emitting diode (LED) 15 and an application specific integrated circuit (ASIC) 16. The display module 11 can be realized by a pico projector. The application processor 13 communicated with the ASIC 16 through the universal serial bus (USB). The eye image capture apparatus 14 communicates with the ASIC 16 through a mobile industry processor interface (MIPI) or a parallel interface. The ASIC 16 turns on/off the first IR LED 15 through the general purpose input output (GPIO) interface.

The backlight module 12, which can be realized by LED, provides a backlight to the display module 11. The eye image capture apparatus 14 captures an eye image. The first IR LED 15 provides a first auxiliary light source to the eye image capture apparatus 14. The ASIC 16 calculates a user's current pupil size according to the eye image. The application processor 13 adjusts the backlight intensity of the backlight module 12 according to the current pupil size in an adjustment mode.

Figure 2:
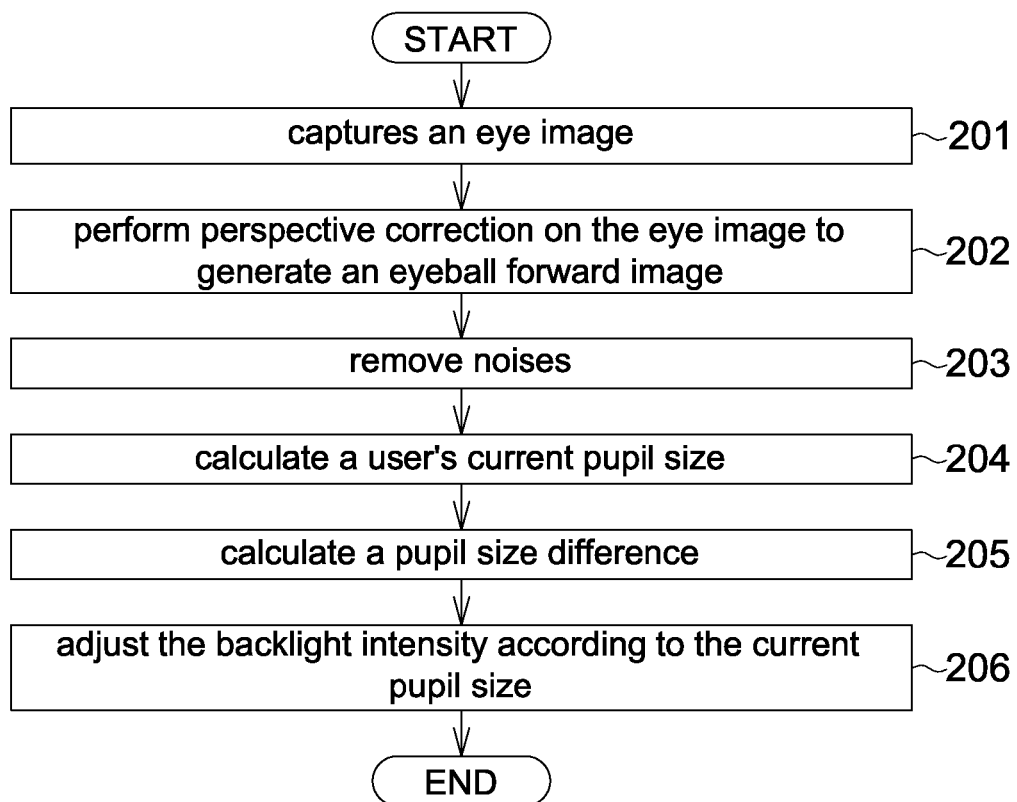
FIG. 2 is a flowchart of a backlight adjustment method of a head mounted display apparatus according to a first embodiment.

Referring to FIG. 1 and FIG. 2. FIG. 2 is a flowchart of a backlight adjustment method of a head mounted display apparatus according to a first embodiment. The backlight adjustment method of head mounted display apparatus 1 comprises following steps. Firstly, the method begins at step 201, the eye image capture apparatus 14 captures an eye image. Then, the method proceeds to step 202, the ASIC 16 performs perspective correction on the eye image to generate an eyeball forward image. The ASIC 16 conveniently obtains the position of eyeball and pupil from the eyeball forward image, and corrects the distortion caused by projection accordingly. Then, the method proceeds to step 203, the ASIC 16 removes noises of the eyeball forward image and removes the interference caused by eyelash and shadow. Before step 203 is performed, the ASIC 16 can firstly detect eyeball to obtain the pupil position to avoid the eye image capture apparatus 14 capturing an image when the user blinks his/her eyes. The image captured when the user blinks his/her eyes will lead to erroneous analysis and judgment.

Then, the method proceeds to step 204, the ASIC 16 calculates the user's current pupil size according to the de-noise eyeball forward image, and further transmits the information of pupil size to the application processor 13. Then, the method proceeds to step 205, the ASIC 16 calculates a pupil size difference between a current pupil size and a previous pupil size. The ASIC 16 outputs a warning signal and the current pupil size to the application processor 13 if the absolute value of the pupil difference is greater than a threshold value. Then, the method proceeds to step 206, the application processor 13, after receiving the warning signal, controls the backlight module 12 to adjust the backlight intensity according to the current pupil size. Since the user's pupil size is controlled by the flexing of the iris sphincter muscle and dilator muscle, the rate of change will not be too fast. The ASIC 16 does not need to frequently calculate the current pupil size, and power consumption can thus be reduced. For instance, the ASIC 16 calculates the current pupil size n times per second, wherein n is a positive integer less than 5.

Then, the method proceeds to step 205, the ASIC 16 calculates a pupil difference, and outputs a warning signal to the application processor 13 if the absolute value of the pupil size difference is greater than a threshold value. When the user is in an environment with feeble luminance, the user's pupils need to be largely dilated in order to see the environment clearly. Meanwhile, if the projection light of a real image is overly bright, the user's pupils will contract instead, and the incoming light of a real image will be insufficient. Under such circumstance, the user cannot see the environment clearly and is thus susceptible to accidents. Therefore, the application processor 13, after receiving the warning signal, firstly controls the backlight module 12 to suitably reduce the backlight intensity to make sure whether the change in pupil size should be ascribed to the ambient light being too strong or the projection light of a virtual image being too strong. After the backlight intensity is reduced, it can be confirmed that the change in pupil is due to the ambient light getting too strong if the user's current pupil size still contracts. Meanwhile, the application processor 13 adjusts the backlight intensity according to the mapping table. However, practical application is not limited thereto. In another embodiment, if the absolute value of pupil difference is less than a threshold value, the application processor 13 can adjust the backlight intensity according to the mapping table. Then, the method proceeds to step 206, when the current pupil size become larger, this indicates that the user is exposed in an environment with low ambient light luminance. Meanwhile, the application processor 13 needs to correspondingly reduce the backlight intensity according to the mapping table otherwise the user will feel the virtual image projected by the display module 11 overly bright and dazzling. Conversely, when the current pupil size becomes smaller, this indicates that the user is exposed in an environment with high ambient light luminance. Meanwhile, the application processor 13 needs to correspondingly increase the backlight intensity according to the mapping table otherwise the user will feel the virtual image projected by the display module 11 too dark and cannot see the virtual image clearly.

It should be noted that the driving signal of the backlight module 12 may be different under different hardware conditions despite the users' pupil size being the same. For instance, different pico projectors may have different designs of optical engine; different backlight modules may have different levels of luminous efficiency; different beam splitters or collimating lenses may have different levels of light loss. Therefore, in a correction mode, the application processor 13 can create a mapping table according to the current pupil size and a driving signal corresponding to the backlight module 12 (the correspondence relationship is illustrated in FIG. 14), wherein the driving signal is an LED driving current.

Figure 13:
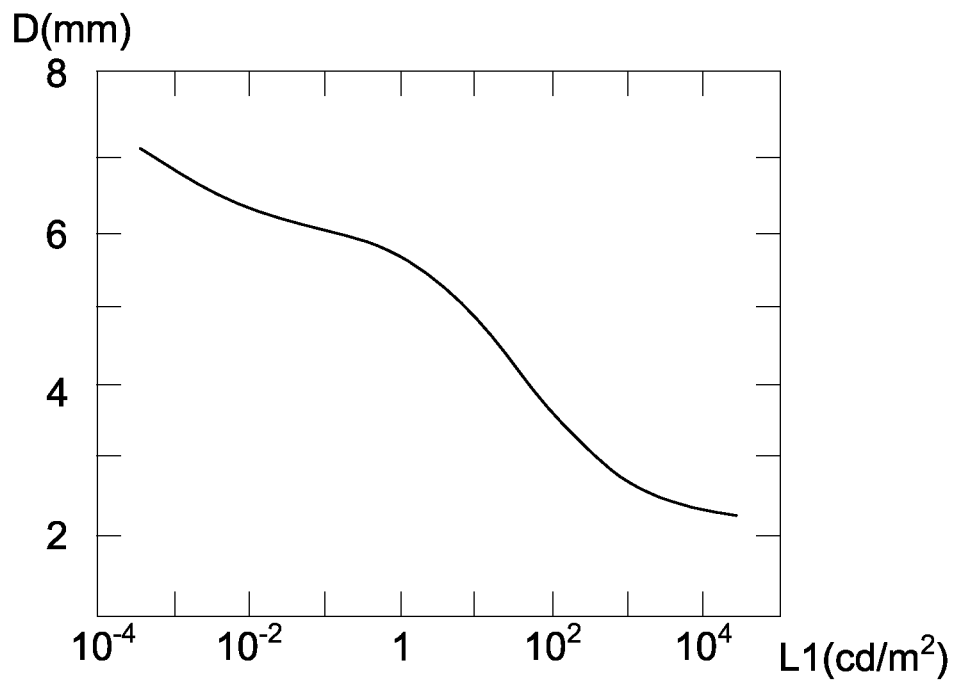
FIG. 13 is a diagram of correspondence relationship between pupil size and luminance of a real image.
Figure 14:
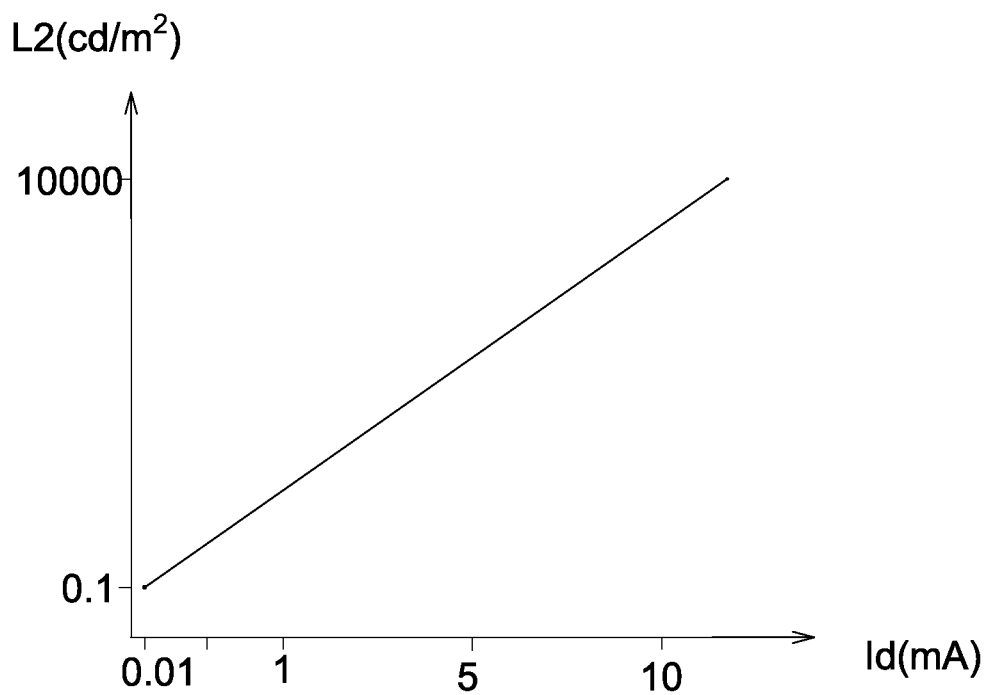
FIG. 14 is a diagram of correspondence relationship between luminance of a real image and driving current.

Referring to FIG. 1, FIG. 13 and FIG. 14. FIG. 13 is a diagram of correspondence relationship between the pupil size and luminance of a real image. FIG. 14 is a diagram of correspondence relationship between luminance of a virtual image and a driving current. In FIG. 13, the designation L1 represents a luminance level of a real image, and the designation L2 represents a luminance level of a virtual image. FIG. 14 is merely a schematic diagram. As disclosed above, the curve fitted from actual measurement may vary from system to system. For convenience of description, the light emitting element of the backlight module 12 is exemplified by LED, and is driven in a current driving mode. In a correction mode, the application processor 13 firstly obtains the user's pupil diameter D according to the eye image captured by the eye image capture apparatus 14 and then determines the corresponding luminance L1 of a real image (also referred as an ambient light luminance) according to the pupil diameter D and FIG. 13. The luminance L2 of a virtual image projected by the display module 11 is expressed as: L2=L1±LTH, wherein L2 represents a luminance level of a virtual image, L1 represents a luminance level of a real image, and ΔTH represents a threshold. Such design is to avoid the pupil diameter D changing radically due to the projection light of a virtual image.

The luminance L2 of a virtual image projected by the display module 11 varies with the driving current Id of the backlight module 12. The driving current Id refers to an LED driving current. In a correction mode, the application processor 13 can generate a mapping table according to the correspondence relationship between luminance L2 of a virtual image and driving current Id as indicated in FIG. 14. Subsequently, when the head mounted display apparatus 1 is in an adjustment mode, the application processor 13 dynamically adjusts luminance L2 of a virtual image according to the pupil diameter D.

It should be noted that in a correction mode, the application processor 13 may determine the correspondence relationship between the pupil diameter D and the luminance L1 of a real image according to FIG. 13 or according to the equation of pupil diameter D which is expressed as: D=5.3-InB, wherein ln represents natural logarithm, and the unit of luminance B of a real image is ft-Lambert (ft-L). Through unit conversion, the unit of the luminance B of a real image can change to candela per square meter ($cd/m^2$), that is, the unit for the luminance L1 of a real image of FIG. 13.

Figure 3:
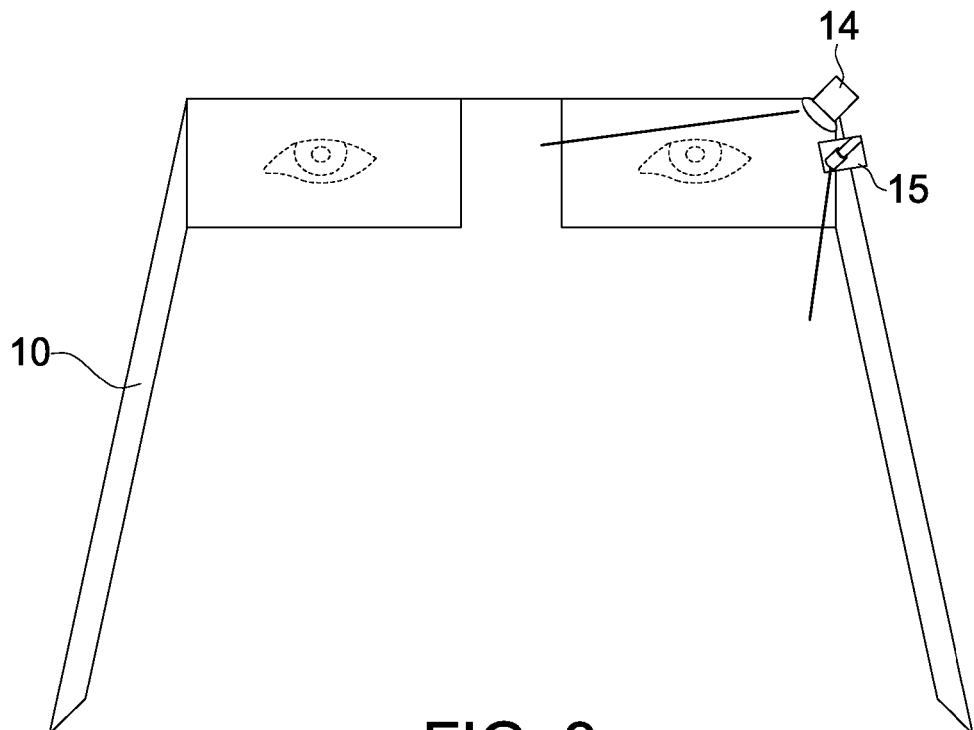
FIG. 3 is a first appearance diagram of a head mounted display apparatus according to a first embodiment.

Referring to FIG. 1 and FIG. 3. FIG. 3 is a first appearance diagram of a head mounted display apparatus according to a first embodiment. In FIG. 3, the head mounted display apparatus 1 of FIG. 1 is exemplified by a head mounted display apparatus 1a, which further comprises a glasses frame 10. The eye image capture apparatus 14 and the first IR LED 15 are disposed at the top right of the lens frame of the glasses frame 10, and the optic axis of the eye image capture apparatus 14 is parallel to the optic axis of the first IR LED 15. A bright pupil effect will be generated if the optic axis of the eye image capture apparatus 14 is parallel to the optic axis of the first IR LED 15. The bright pupil effect reduces the interference caused by eyelash and shadow, and is beneficial to detecting the pupil when the ambient light luminance is low. Also, the bright pupil effect is beneficial to detecting the pupil for those users with blue or gray eyes.

Figure 4:
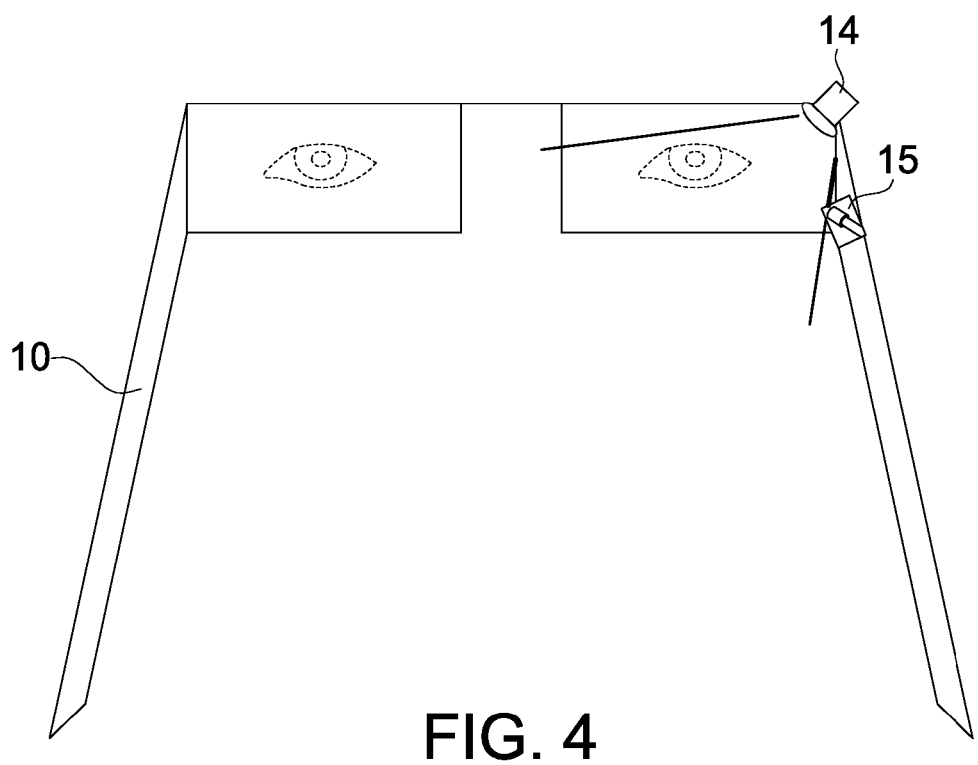
FIG. 4 is a second appearance diagram of a head mounted display apparatus according to a first embodiment.

Referring to FIG. 1 and FIG. 4. FIG. 4 is a second appearance diagram of a head mounted display apparatus according to a first embodiment. In FIG. 4, the head mounted display apparatus 1 of FIG. 1 is exemplified by the head mounted display apparatus 1b, which further comprises glasses frame 10. The eye image capture apparatus 14 is disposed at the top right the lens frame of the glasses frame 10, and the first IR LED 15 is disposed at the bottom right of the lens frame of the glasses frame 10. The optic axis of the eye image capture apparatus 14 and the optic axis of the first IR LED 15 form an angle. A dark pupil effect will be generated if the optic axis of the eye image capture apparatus 14 forms an angle to the optic axis of the first IR LED 15. The dark pupil effect is beneficial to detecting the pupil if the ambient light luminance is high and natural light is available. Also, the bright pupil effect is beneficial to detecting the pupil for those users with dark eyes.

Figure 5:
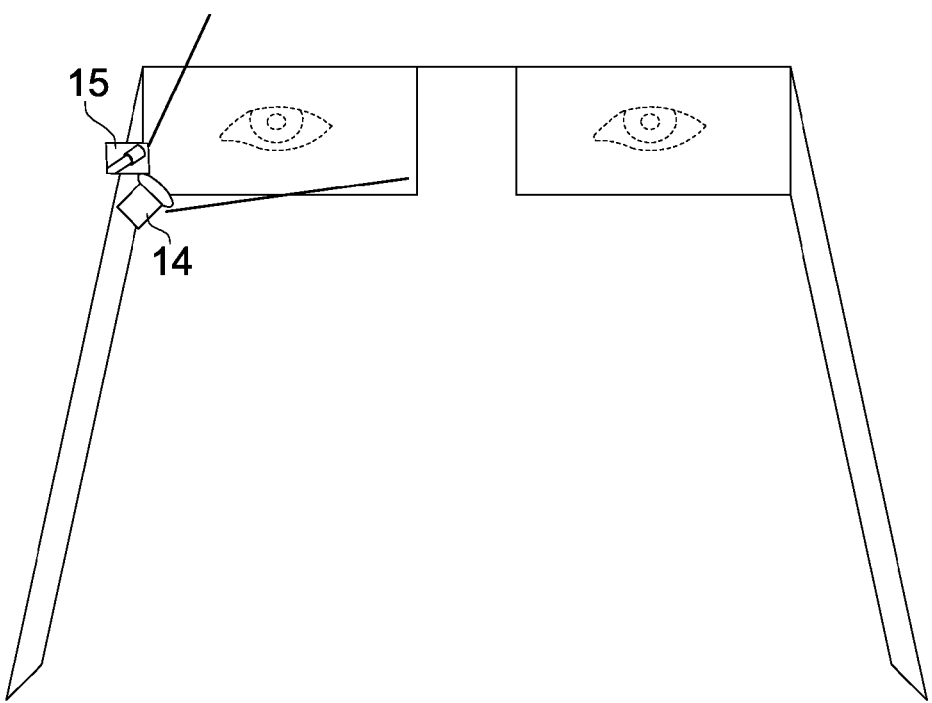
FIG. 5 is a third appearance diagram of a head mounted display apparatus according to a first embodiment.

Referring to FIG. 1 and FIG. 5. FIG. 5 is a third appearance diagram of a head mounted display apparatus according to a first embodiment. In FIG. 5 the head mounted display apparatus 1 of FIG. 1 is exemplified by a head mounted display apparatus 1c, which further comprises a glasses frame 10. The eye image capture apparatus 14 and the first IR LED 15 are disposed at the bottom left of the lens frame of the glasses frame 10, and the optic axis of the eye image capture apparatus 14 is parallel to the optic axis of the first IR LED 15.

Figure 6:
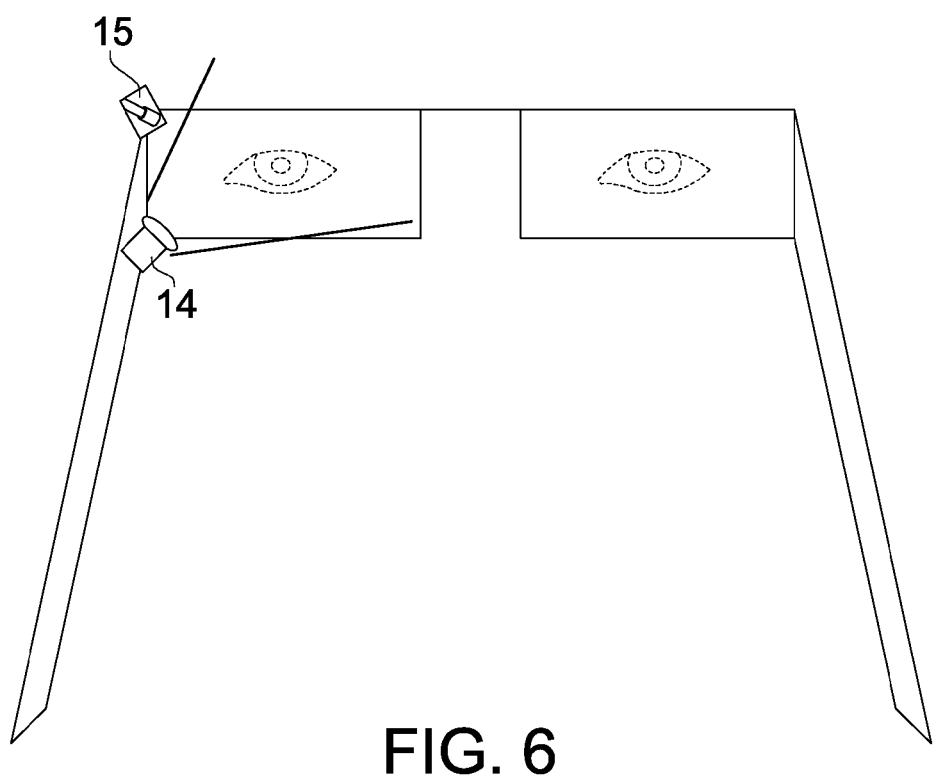
FIG. 6 is a fourth appearance diagram of a head mounted display apparatus according to a first embodiment.

Referring to FIG. 1 and FIG. 6. FIG. 6 is a fourth appearance diagram of a head mounted display apparatus according to a first embodiment. In FIG. 6, the head mounted display apparatus 1 of FIG. 1 is exemplified by a head mounted display apparatus 1d, which further comprises glasses frame 10. The eye image capture apparatus 14 is disposed at the bottom left of the lens frame of the glasses frame 10, and the first IR LED 15 is disposed at the top left of the lens frame of the glasses frame 10. The optic axis of the eye image capture apparatus 14 and the optic axis of the first IR LED 15 form an angle.

Figure 7:
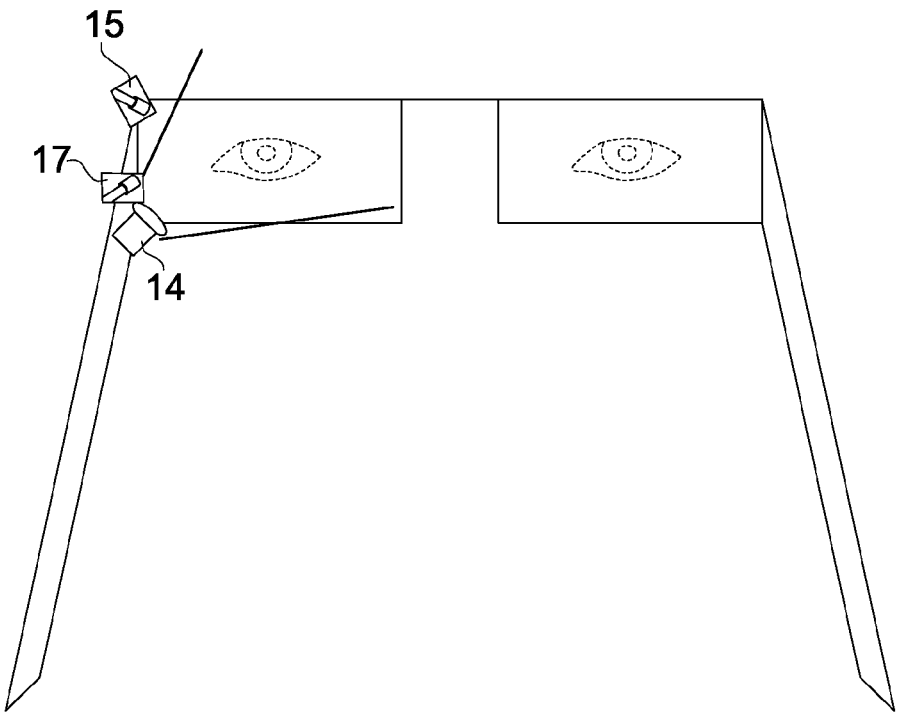
FIG. 7 is a fifth appearance diagram of a head mounted display apparatus according to a first embodiment.

Referring to FIG. 1 and FIG. 7. FIG. 7 is a fifth appearance diagram of a head mounted display apparatus according to a first embodiment. In FIG. 7, the head mounted display apparatus 1 of FIG. 1 is exemplified by a head mounted display apparatus 1e, which further comprises a glasses frame 10 and a second IR LED 17. The ASIC 16 turns on/off the second IR LED 17 through a general purpose input output interface. The eye image capture apparatus 14 and the second IR LED 17 are disposed at the bottom left of the lens frame of the glasses frame 10, and the first IR LED 15 is disposed at the top left of the lens frame of the glasses frame 10. The optic axis of the eye image capture apparatus 14 and the optic axis of the first IR LED 15 form an angle. The optic axis of the eye image capture apparatus 14 is parallel to the optic axis of the second IR LED 17. The ASIC 16 can selectively turn on the first IR LED 15 or the second IR LED 17 according to the conditions of the environment and determines whether to detect the user's current pupil size in conjunction with the bright pupil effect or the dark pupil effect.

Second Embodiment

Figure 8:
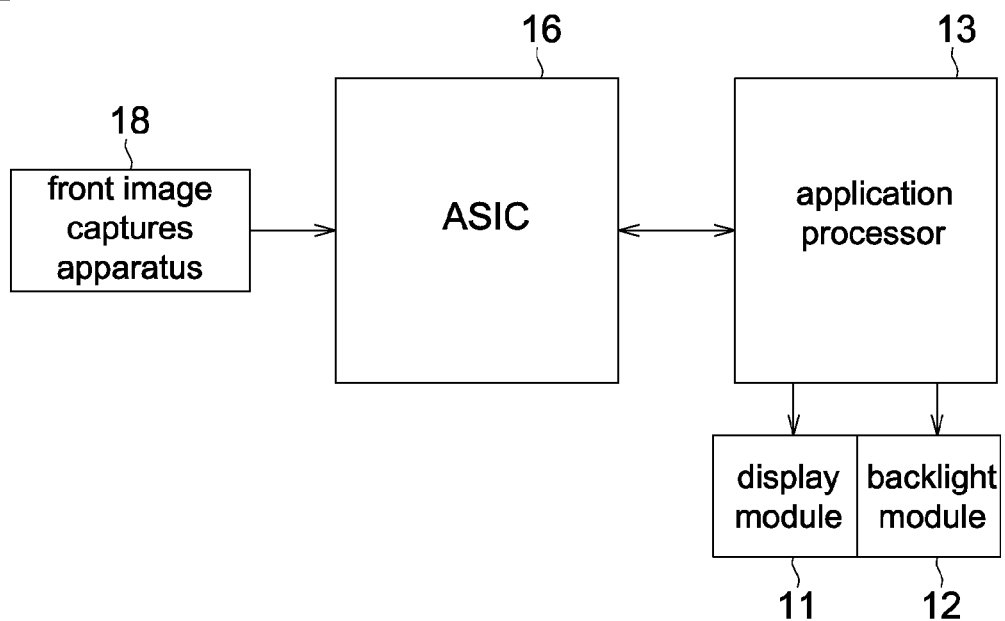
FIG. 8 is a block diagram of a head mounted display apparatus according to a second embodiment.
Figure 9:
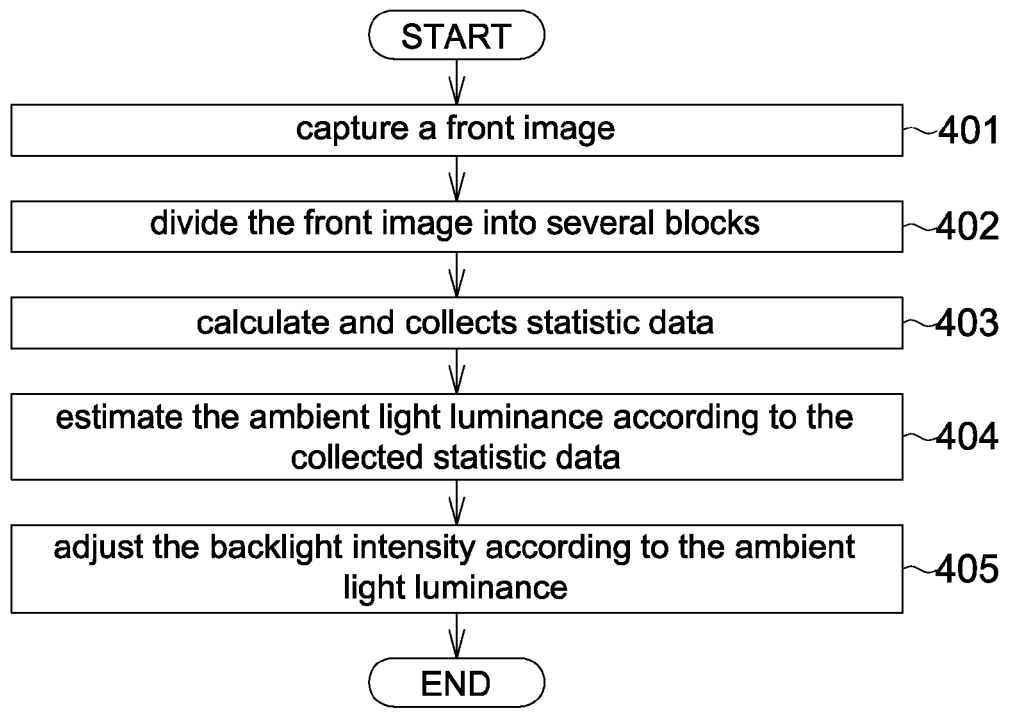
FIG. 9 is a flowchart of a backlight adjustment method of a head mounted display apparatus according to a second embodiment.
Figure 10:
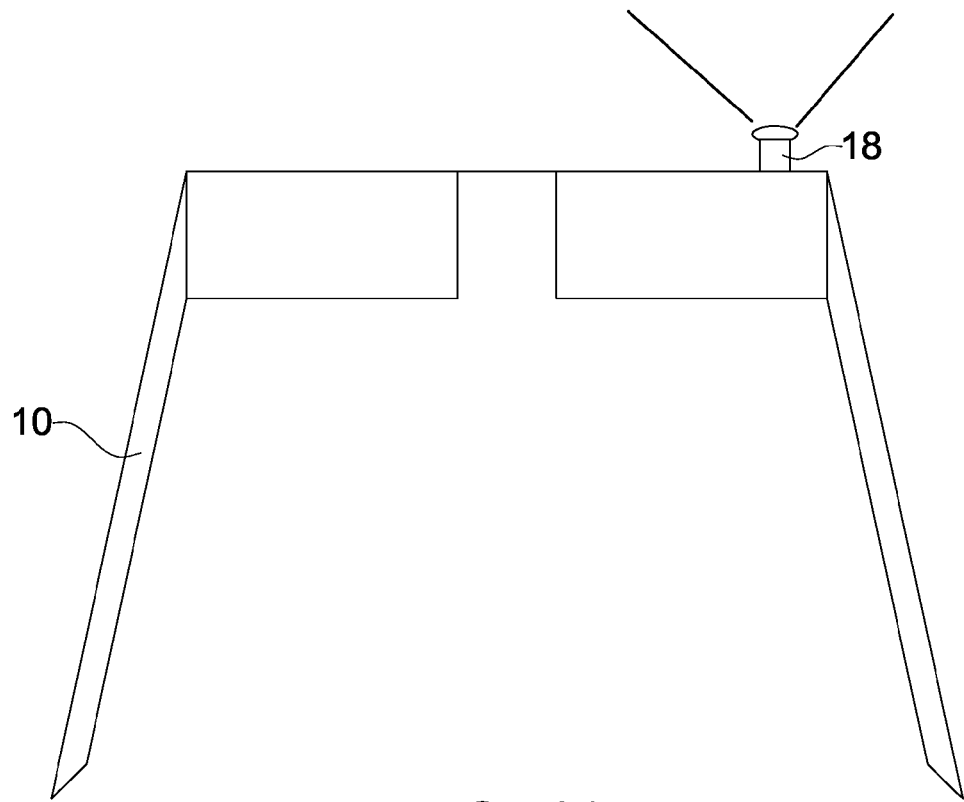
FIG. 10 is an appearance diagram of a head mounted display apparatus according to a second embodiment.

Referring to FIG. 8, FIG. 9 and FIG. 10. FIG. 8 is a block diagram of a head mounted display apparatus according to a second embodiment. FIG. 9 is a flowchart of a backlight adjustment method of a head mounted display apparatus according to a second embodiment. FIG. 10 is an appearance diagram of a head mounted display apparatus according to a second embodiment. The second embodiment is different from the first embodiment mainly in that the head mounted display apparatus 3 adjusts the backlight intensity through a front image captured by the front image captures apparatus 18, wherein the view angle of the front image captures apparatus 18 is about the same as the user's view angle.

The backlight adjustment method of the head mounted display apparatus 3 comprises following steps. Firstly, the method begins at step 401, the front image captures apparatus 18 captures a user's front image. Since the front image is used to detect the front ambient light luminance, the function of auto exposure (AE) is turned off. In other words, analog gain, digital gain and exposure time need to be fixed when the front image captures apparatus 18 captures the front image. Then, the method proceeds to step 402, the ASIC 16 divides the front image into N×N blocks, wherein N is a positive integer greater than or equal to 1. The advantage of dividing the front image into N×N blocks by the ASIC 16 is that different weighting factors can be assigned to different blocks. For instance, the block at the central point of the vision corresponds to a larger weighting factor. Or, the ASIC 16 adjusts the weighting factors according to a saliency map. The ASIC 16 can assume that the central point of the vision is at the central part of the front image, so that a larger weighting factor is assigned to the central part of the front image. Then, the method proceeds to step 403, the ASIC 16 calculates and collects statistic data. Then, the method proceeds to step 404, the ASIC 16 estimates the ambient light luminance according to the collected statistic data. Then, the method proceeds to step 405, the application processor 13 adjusts the backlight intensity according to the ambient light luminance.

Third Embodiment

Figure 11:
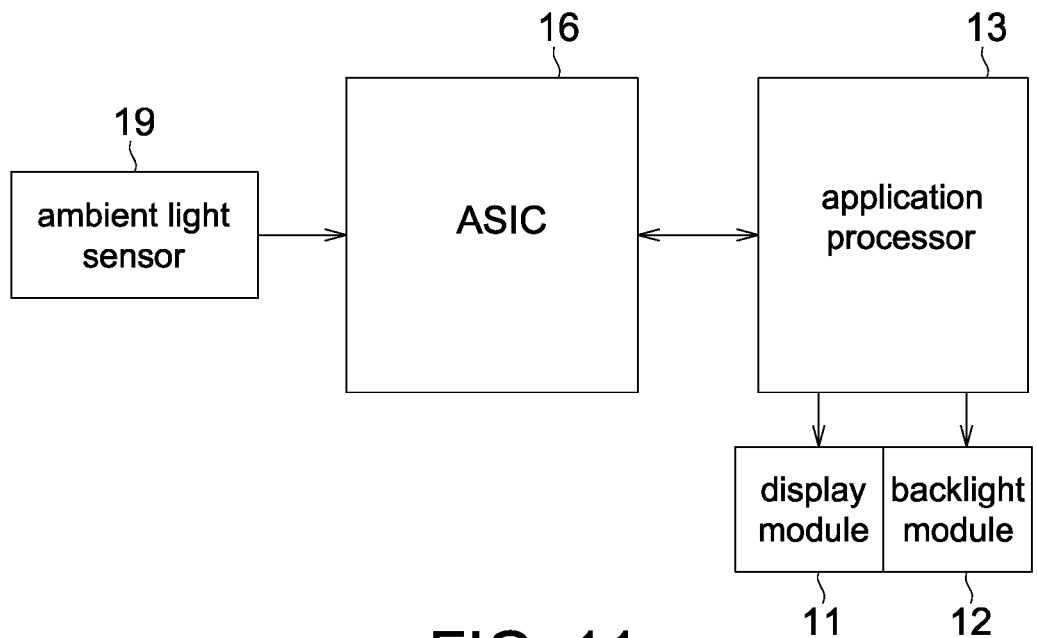
FIG. 11 is a block diagram of a head mounted display apparatus according to a third embodiment.
Figure 12:
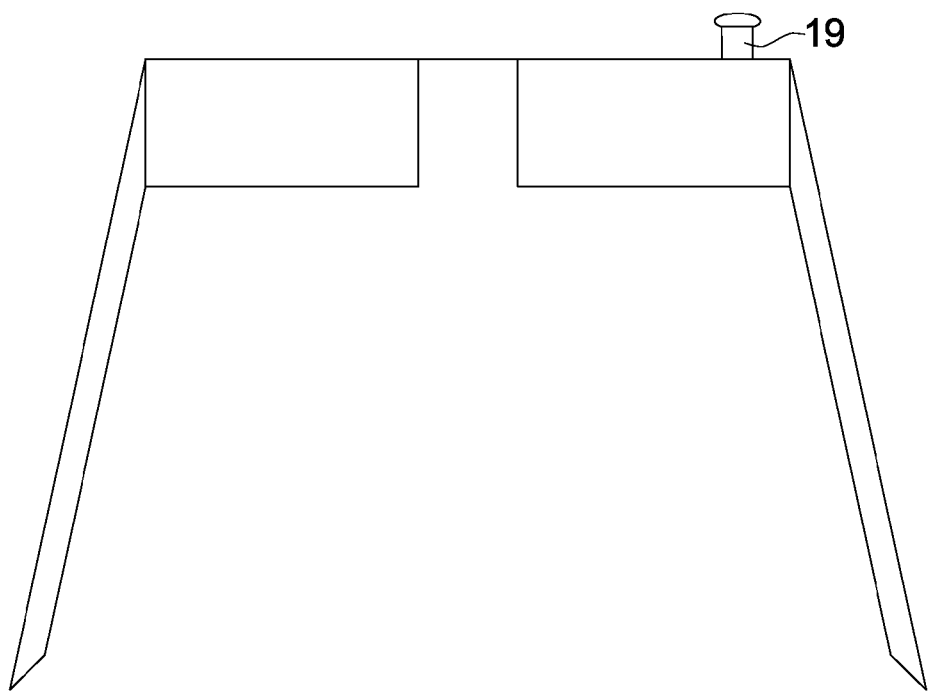
FIG. 12 is an appearance diagram of a head mounted display apparatus according to a third embodiment.

Referring to FIG. 11 and FIG. 12. FIG. 11 is a block diagram of a head mounted display apparatus according to a third embodiment. FIG. 12 is an appearance diagram of a head mounted display apparatus according to a third embodiment. The third embodiment is different from the second embodiment mainly in that the head mounted display apparatus 5 adjusts the backlight intensity according to the ambient light luminance detected by an ambient light sensor (ALS) 19. The ALS 19 detects not only the front luminance, but also the ambient light luminance of the environment.

The head mounted display apparatus and the backlight adjustment method thereof disclosed in above embodiments are for exemplary purpose only. In some embodiments, the head mounted display apparatus can have more than two IR LEDs. Also, during the detection of the user's current pupil size, more than one IR LED can be turned on each time.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A head mounted display apparatus, comprising:
   a display module;
   a backlight module for providing a backlight to the display module;
   an application processor;
   an eye image capture apparatus for capturing an eye image;
   a first infrared light emitting diode for providing a first auxiliary light source to the eye image capture apparatus; and
   an application specific integrated circuit (ASIC) for calculating a current pupil size according to the eye image and a pupil size difference between the current pupil size and a previous pupil size, and outputs a warning signal and the current pupil size to the application processor if the absolute value of the pupil size difference is greater than a threshold value, wherein the application processor adjusts a backlight intensity of the backlight module according to the current pupil size in an adjustment mode.

2. The head mounted display apparatus according to claim 1, wherein the application processor, after receiving the warning signal, controls the backlight module to adjust the backlight intensity according to the current pupil size.

3. The head mounted display apparatus according to claim 2, wherein the application processor, after receiving the warning signal, controls the backlight module to reduce the backlight intensity, and after the backlight intensity is reduced, the application processor adjusts the backlight intensity according to a mapping table if the current pupil size still contracts.

4. The head mounted display apparatus according to claim 1, wherein the optic axis of the eye image capture apparatus is parallel to the optic axis of the first infrared light emitting diode.

5. The head mounted display apparatus according to claim 4, further comprising:
   a glasses frame, wherein the eye image capture apparatus and the first infrared light emitting diode are disposed at the top right of a lens frame of the glasses frame.

6. The head mounted display apparatus according to claim 4, further comprising:
   a glasses frame, wherein the eye image capture apparatus and the first infrared light emitting diode are disposed at the bottom left of a lens frame of the glasses frame.

7. The head mounted display apparatus according to claim 1, wherein the optic axis of the eye image capture apparatus and the optic axis of the first infrared light emitting diode form an angle.

8. The head mounted display apparatus according to claim 7, further comprising:
   a glasses frame, wherein the eye image capture apparatus is disposed at the top right of a lens frame of the glasses frame, and the first infrared light emitting diode is disposed at the bottom right of the lens frame of the glasses frame.

9. The head mounted display apparatus according to claim 7, further comprising:
   a glasses frame, wherein the eye image capture apparatus is disposed at the bottom left of a lens frame of the glasses frame, and the first infrared light emitting diode is disposed at the top left of the lens frame of the glasses frame.

10. The head mounted display apparatus according to claim 7, further comprising:
    a second infrared light emitting diode for providing a second auxiliary light source to the eye image capture apparatus, wherein the optic axis of the eye image capture apparatus is parallel to the optic axis of the second infrared light emitting diode.

11. The head mounted display apparatus according to claim 1, wherein the application processor creates a mapping table according to the current pupil size and a driving signal corresponding to the backlight module in a correction mode.

12. A backlight adjustment method of head mounted display apparatus, comprising:
    capturing an eye image by an eye image capture apparatus;
    providing a first auxiliary light source to an eye image capture apparatus by a first infrared light emitting diode;
    calculating a current pupil size according to the eye image, wherein in the calculation step, a pupil size difference between the current pupil size and a previous pupil size is calculated, and a warning signal and the current pupil size are outputted to an application processor if the pupil size difference is greater than a threshold value; and
    adjusting a backlight intensity of a backlight module according to the current pupil size in an adjustment mode.

13. The backlight adjustment method according to claim 12, wherein in the adjustment step, the application processor, after receiving the warning signal, controls the backlight module to adjust the backlight intensity according to the current pupil size.

14. The backlight adjustment method according to claim 13, wherein the application processor, after receiving the warning signal, controls the backlight module to reduce the backlight intensity, and after the backlight intensity is reduced, the application processor adjusts the backlight intensity according to a mapping table if the current pupil size still contracts.

15. The backlight adjustment method according to claim 12, further comprising:
    creating a mapping table according to the current pupil size and a driving signal corresponding to the backlight module in a correction mode.

* * * * *